(No Model.)

H. C. & J. N. TOWER.
ROTARY PEG CUTTER.

No. 252,337. Patented Jan. 17, 1882.

Witnesses:
W. J. Dudley.
H. H. Letteney.

Inventors:
Hermon C. Tower
John N. Tower
By Porter & Hutchinson, Attys

UNITED STATES PATENT OFFICE.

HERMON C. TOWER AND JOHN N. TOWER, OF HUDSON, MASSACHUSETTS.

ROTARY PEG-CUTTER.

SPECIFICATION forming part of Letters Patent No. 252,337, dated January 17, 1882.

Application filed July 8, 1881. (No model.)

*To all whom it may concern:*

Be it known that I, HERMON C. TOWER and JOHN N. TOWER, of Hudson, State of Massachusetts, have invented an Improvement in Rotary Peg-Cutters, of which the following is a specification.

The object of our invention is to effect an improvement in that class of peg-cutters in which a small-toothed pivotal cutter is arranged to rotate in the end of an arm, which is introduced within the boot or shoe in which the pegs are to be trimmed and cut smooth with the surface of the inner sole, said improvement having for its special object ready adjustment of the height of such cutter relatively to the surrounding wall of the arm; and the invention consists in forming the gear which is directly in contact with and imparts motion to said rotary cutter with a nipple, rim, or wall surrounding the pivotal screw, and having an exterior screw-thread corresponding to and engaging an interior thread in said cutter, whereby such cutter can be removed from the gear without displacement of the latter, and a washer of any desired thickness interposed between the gear and cutter, whereby the latter will be so raised relatively to the surrounding wall of the arm, all as will be hereinafter fully described in connection with the annexed drawings, and specifically defined in the appended claims.

Figure 1:
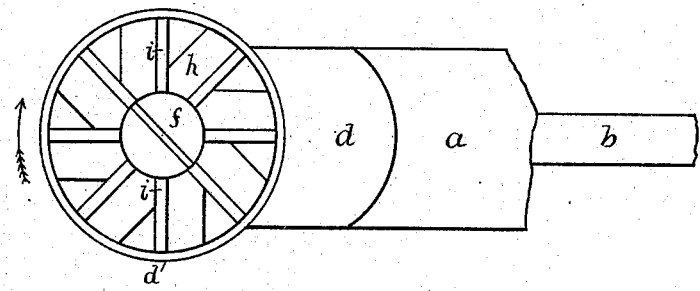
Figure 2:
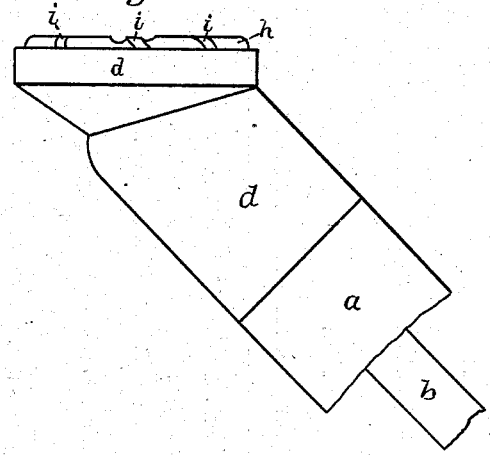
Figure 3:
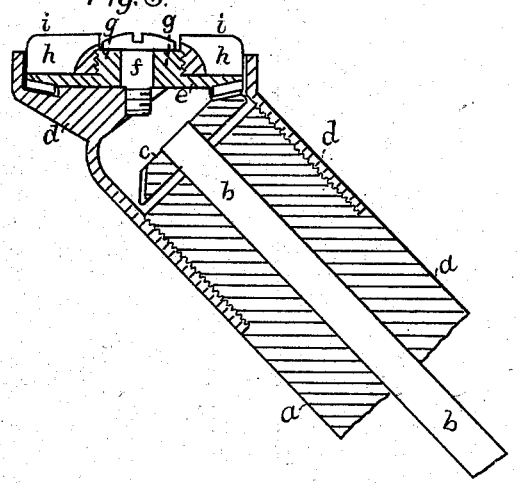

Figure 1 is a top or plan view of a portion of a machine showing my invention. Fig. 2 is a side elevation of Fig. 1. Fig. 3 is a longitudinal vertical section of the same.

In said views, $a$ represents the upper portion of the usual arm, which is secured to the bed of the machine at any desired angle, and through which motion is imparted to the cutters by the small shaft $b$, journaled in said arm, and to the upper end of which is secured the small miter-gear $c$, as shown in Fig. 3.

A short tubular elbow, $d$, is threaded to arm $a$, as shown in said section, and in fact constitutes an extension of said arm, but is formed separately and then secured thereto for convenience of construction and assembling of the several parts. In the upper cavity of said elbow a seat is formed upon a shelf projecting from the inclosing wall, and upon said shelf is seated a small miter-gear, $e$, that meshes with said lower gear, $c$, from which latter said gear $e$ derives rotary motion. Gear $e$ is journaled upon and secured in position by screw $f$, the lower threaded and diminished section whereof engages a corresponding thread in the shelf-like seat on which gear $e$ rests, the enlarged portion of said screw forming a shoulder which, by its contact with said seat, serves as a means of locking said screw in position so as to insure its not working loose by the action or frictional contact of gear $e$, which is journaled thereon.

Upon the upper face or side of gear $e$ is formed the concentric wall $g$, which surrounds the aperture in the disk portion or body of the gear, the outer diameter of such wall being slightly more than the diameter of the head of screw $f$, and having cut upon it a screw-thread, which should be in its pitch or path opposite to the direction of rotation of gear $e$ and the cutter thereto secured, which in the drawings is indicated by the arrow in Fig. 1 as to the right, and consequently the thread on said wall should be left handed, in order that the resistance offered to the cutter when performing its work may not disengage it, but, on the contrary, serve to hold it in place on the gear.

The cutter $h$ is formed with an interior threaded axial passage corresponding to the thread on rim $g$, which renders the engaging or disengaging of such cutter with or from the gear $e$ but the work of a moment, and this without disturbance of either said gear or its pivotal screw $f$, as the passage in the cutter is of course greater than the head of said screw. When the teeth $i$ of said cutter have become lowered either by use or sharpening, or both, the cutter can be readily unscrewed from the gear and a disk of paper or other material introduced between them, thereby raising the cutter to the required height above the walls of elbow $d$.

Heretofore either the cutter and gear $e$ have been both directly secured in place by screw $f$, or said cutter has been secured to the gear by screws passing up through the latter and threaded in the former. In such former case the interposition of a washer between the gear and cutter rendered the permanent slacking up of screw $f$ necessary, and thereby endangered its working loose when the machine was in operation, while the other method of adjustment not only rendered it necessary to remove the gear in order to interpose said washer, but the cost of construction of the parts was materially increased and the facility of duplication greatly reduced.

We claim—

1. The combination of gear $e$, having the externally-threaded wall or rim $g$, and the cutter $h$, having a corresponding interior threaded passage, and to be seated upon said gear, substantially as specified.

2. The combination of gear $e$, having the externally-threaded wall or ring $g$, the cutter $h$, having a corresponding interior threaded passage, and the self-locking screw $f$, to serve as the journal of said gear, substantially as specified.

HERMON C. TOWER.
JOHN N. TOWER.

Witnesses:
JOSIAH S. WELSH,
GEO. W. W. EDSON.